(12) United States Patent
Chida et al.

(10) Patent No.: US 7,951,738 B2
(45) Date of Patent: May 31, 2011

(54) PROCESS FOR PRODUCING ZEOLITE SEPARATION MEMBRANE

(75) Inventors: Hiroyuki Chida, Tokyo (JP); Takehito Mizuno, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 175 days.

(21) Appl. No.: 12/088,377

(22) PCT Filed: Jul. 27, 2006

(86) PCT No.: PCT/JP2006/314893
§ 371 (c)(1),
(2), (4) Date: Nov. 24, 2008

(87) PCT Pub. No.: WO2007/037066
PCT Pub. Date: Apr. 5, 2007

(65) Prior Publication Data
US 2009/0269276 A1 Oct. 29, 2009

(30) Foreign Application Priority Data

Sep. 28, 2005 (JP) ................ P2005-282803

(51) Int. Cl.
*B01J 35/00* (2006.01)
*B01J 29/06* (2006.01)
(52) U.S. Cl. .... 502/4; 502/60; 502/527.14; 502/527.15; 502/527.16; 423/709
(58) Field of Classification Search ................ 502/4, 60, 502/527.14, 527.15, 527.16; 423/709
See application file for complete search history.

(56) References Cited

U.S. PATENT DOCUMENTS

| | | |
|---|---|---|
| 6,767,384 B1 | 7/2004 | Vu et al. |
| 2001/0056215 A1 | 12/2001 | Verduijn et al. |
| 2005/0067344 A1 | 3/2005 | Tanaka et al. |
| 2007/0265484 A1 | 11/2007 | Li et al. |
| 2009/0130000 A1 | 5/2009 | Inoue |
| 2009/0220414 A1 | 9/2009 | Mizuno |
| 2010/0233364 A1 | 9/2010 | Mizuno et al. |

FOREIGN PATENT DOCUMENTS

| | | |
|---|---|---|
| EP | 0 976 440 | 2/2000 |
| JP | 63-291809 | 11/1988 |
| JP | 7-109116 | 4/1995 |
| JP | 8-257301 | 10/1996 |
| JP | 8-257302 | 10/1996 |
| JP | 8-318141 | 12/1996 |
| JP | 10-36113 | 2/1998 |
| JP | 10-114516 | 5/1998 |
| JP | 10-212117 | 8/1998 |
| JP | 2000-42387 | 2/2000 |
| JP | 2001-097715 | 4/2001 |
| JP | 2002-18247 | 1/2002 |
| JP | 2002-58972 A | 2/2002 |
| JP | 2003-326142 A | 11/2003 |
| JP | 2004-82008 A | 3/2004 |
| JP | 2004-123415 | 4/2004 |
| JP | 2005-125313 A | 5/2005 |
| JP | 2006-159031 A | 6/2006 |
| WO | 96/01683 A1 | 1/1996 |
| WO | 02/38258 | 5/2002 |
| WO | 2005/014481 | 2/2005 |
| WO | 2006/059394 | 6/2006 |

OTHER PUBLICATIONS

Li et al., "SAPO-34 membranes for CO2/CH4 separation", Journal of Membrane Science, 241:121-135 (2004).
Burriesci, N., et al., "Influence of Temperature on Hydrothermal Synthesis of Zeolites from Lipari Pumice", Materials Chemistry and Physics, Apr. 1983, pp. 305-314, vol. 8, No. 4, Elsevier Sequoia, Netherlands, XP022846979.

*Primary Examiner* — Elizabeth D Wood
(74) *Attorney, Agent, or Firm* — Sughrue Mion, PLLC

(57) ABSTRACT

The present invention provides a process for production of a zeolite separation membrane with satisfactory separation performance. The process for production of a zeolite separation membrane according to the invention is comprising: a seed crystal-attaching step in which: a sealed body (10), which is obtained by sealing both ends of a cylindrical porous body (11) with sealing members (12a, 12b), is immersed from the sealing member (12a) end into a suspension (22) containing zeolite seed crystals; the suspension (22) is allowed to permeate from the exterior of the porous body (11) to the interior thereof; the zeolite seed crystals are thereby attached to the porous body (11); and a seed crystal-attached porous body is obtained; and a zeolite membrane-forming step in which: the seed crystal-attached porous body is contacted with a reaction solution containing the raw material of a zeolite membrane; the zeolite membrane is formed on the porous body (11); and a zeolite separation membrane is obtained.

4 Claims, 8 Drawing Sheets

PROCESS FOR PRODUCING ZEOLITE SEPARATION MEMBRANE

TECHNICAL FIELD

The present invention relates to a process for production of a zeolite separation membrane.

BACKGROUND ART

Zeolite, a typical crystalline porous material, is a material that has solid acid properties, ion exchange properties, adsorption/separation properties and molecular pores as a result of its porous structure. In recent years, zeolite membranes have been the subject of much interest for their potential use as separation membranes for water in organic solvents. In such cases, a zeolite membrane is formed on a porous body, and these as a whole function as a separation membrane.

A well-known method for producing a zeolite membrane is the "hydrothermal synthesis" method, in which: a support is contacted with a reaction solution containing the raw material of a zeolite membrane, which is composed mainly of silica source and alumina source; and the silica source and alumina source in the reaction solution are reacted to form the zeolite membrane on the surface of the porous body.

However, when a porous body is suddenly contacted with a reaction solution containing the raw material of a zeolite membrane, pinholes tend to be formed in the formed zeolite separation membrane, thus lowering the separation performance.

Therefore, a generally-used process is one in which: a porous body is contacted with a slurry containing zeolite seed crystals to attach the seed crystals to the porous body before contacting the porous body with a reaction solution containing the raw material of a zeolite membrane to form the zeolite membrane on the porous body; the seed crystal-attached porous body is then contacted with the reaction solution containing the raw material of the zeolite membrane; and the zeolite membrane is thereby formed around the seed crystals on the porous body (for example, see Patent document 1).

Patent document 1: Japanese Patent Application Laid-Open No. 2004-82008

DISCLOSURE OF THE INVENTION

Problem to be Solved by the Invention

Dip coating is a method often used for contacting a porous body with a slurry containing zeolite seed crystals. In this method, a cylindrical porous body with both ends open is used, so that the fluid to be separated may be collected inside the separation membrane during separation and it may be discharged from the porous body.

However, when a zeolite membrane is produced by the production process for a zeolite separation membrane described in Patent document 1, the resulting zeolite membrane often tends to exhibit insufficient separation performance.

It is therefore an object of the present invention to provide a process for production of a zeolite separation membrane that allows production of a zeolite separation membrane with adequate separation performance.

Means for Solving the Problem

As a result of diligent research directed toward solving the problem mentioned above, the present inventors found that if a porous body with both ends open is dip-coated with a suspension containing zeolite seed crystals, adequate infiltration of the seed crystals into the pores of the porous body and formation of a dense zeolite membrane on the porous body do not occur, because the suspension is introduced inside as well as outside the porous body, thus preventing creation of a pressure difference between the interior and exterior of the porous body, and reducing the driving force that causes the seed crystals to penetrate into the pores of the porous body. As a result of further research, the present inventors found that this problem can be solved by creating a pressure difference between the interior and exterior of a porous body when the porous body is immersed in a suspension containing seed crystals. The present invention has been completed upon this finding.

Specifically, the present invention provides a process for production of a zeolite separation membrane, comprising: a seed crystal-attaching step in which: a tubular porous body having at least one end sealed with a sealing member is immersed from the sealing member end into a suspension containing zeolite seed crystals; the suspension is allowed to permeate from the exterior of the porous body to the interior thereof; the zeolite seed crystals are thereby attached to the porous body; and a seed crystal-attached porous body is obtained; and a zeolite membrane-forming step in which: the seed crystal-attached porous body is contacted with a reaction solution containing the raw material of a zeolite membrane; the zeolite membrane is formed on the porous body; and a zeolite separation membrane is obtained.

In the zeolite separation membrane production process of the invention, a porous body having at least one end sealed is immersed from its sealing member end into a suspension containing zeolite seed crystals in the seed crystal-attaching step. At this stage, the interior of the porous body is hollow, and the suspension is present outside the porous body. A pressure difference is therefore created between the interior and exterior of the porous body, and the suspension permeates from the exterior of the porous body toward the interior thereof. As a result, the suspension sufficiently penetrates into the pores of the porous body, thus allowing adequate introduction of seed crystals into the porous body.

The seed crystal-attached porous body thus obtained is contacted with a reaction solution containing the raw material of a zeolite membrane, and zeolite crystals are grown around the seed crystals to form the zeolite membrane. The zeolite membrane is formed even inside the pores of the seed crystal-attached porous body. Consequently, the zeolite separation membrane production process of the invention makes it possible to form a dense zeolite membrane on a porous body and to produce a zeolite separation membrane with satisfactory separation performance.

In the zeolite separation membrane production process of the invention, a porous body having at least one end sealed is employed, and the porous body is immersed from the sealed end. Consequently, attachment of seed crystals to the inside of the porous body is prevented, if the porous body is immersed in the suspension so that the suspension may not enter the interior of the porous body. If seed crystals are present on the inside of the porous body, zeolite crystals will fail to grow sufficiently on these seed crystals during the zeolite membrane-forming step, making it impossible to obtain a dense zeolite membrane, and these seed crystals will not only fail to enhance the separation performance, but also lower the permeation flux. According to the zeolite separation membrane production process of the invention, however, seed crystals do not attach to the inside of the porous body, and therefore a reduction in the permeation flux is satisfactorily prevented.

In the zeolite separation membrane production process described above, it is preferred that one end of the porous body is open and the other end is sealed. If one end of the porous body is open, it is possible to consistently maintain ordinary pressure inside the porous body. It will therefore be possible to prevent a reduction in the pressure difference between the exterior and interior of the porous body, and to prevent a reduction with time in the amount of suspension permeating from the exterior of the porous body to the interior thereof.

In the zeolite separation membrane production process described above, it is preferred that the sealing member is provided in a detachable manner on at least one end of the porous body, and that in the zeolite membrane-forming step, the sealing member is detached from the porous body to obtain the zeolite separation membrane.

In this case, since detachment of the sealing member from the porous body is easy, the zeolite separation membrane will be more easily produced.

The invention also provides a process for production of a zeolite separation membrane, comprising: a seed crystal-attaching step in which: a suspension containing zeolite seed crystals is introduced into a tubular porous body from the open end thereof, the porous body having one end sealed with a sealing member and the other end open; the suspension is allowed to permeate from the interior of the porous body to the exterior thereof; the zeolite seed crystals are thereby attached to the porous body; and a seed crystal-attached porous body is obtained; and a zeolite membrane-forming step in which: a reaction solution containing the raw material of a zeolite membrane is introduced into the interior of the seed crystal-attached porous body; the zeolite membrane is formed on the seed crystal-attached porous body; and a zeolite separation membrane is obtained.

In this zeolite separation membrane production process, a suspension containing zeolite seed crystals is introduced into the interior of a porous body having one end sealed with the sealing member from the non-sealed end in the seed crystal-attaching step. At this stage, the exterior of the porous body is at ordinary pressure (atmospheric pressure), and the suspension is present inside the porous body. In other words, the pressure outside the porous body is atmospheric pressure, while the hydraulic pressure of the suspension is exerted inside the porous body. In the seed crystal-attaching step, a pressure difference is therefore created between the exterior and interior of the porous body, and the suspension permeates from the interior of the porous body to the exterior thereof. As a result, the suspension sufficiently penetrates into the pores of the porous body, thus allowing adequate introduction of seed crystals into the porous body.

The seed crystals are contacted with a reaction solution containing the raw material of a zeolite membrane by introducing the reaction solution into the obtained seed crystal-attached porous body from the end which is not sealed with a sealing member. As a result, zeolite crystals grow around the seed crystals to form the zeolite membrane. The zeolite membrane is formed even inside the pores of the seed crystal-attached porous body. Consequently, the zeolite separation membrane production process of the invention makes it possible to form a dense zeolite membrane on the inside of a porous body and to produce a zeolite separation membrane with satisfactory separation performance.

In this zeolite separation membrane production process of the invention, since the suspension is not present outside the porous body, attachment of seed crystals to the outside of the porous body is prevented.

If seed crystals have attached to the outside of the porous body, zeolite crystals will fail to grow on these seed crystals during the zeolite membrane-forming step, making it impossible to obtain a dense zeolite membrane, and these seed crystals will also lower the permeation flux. According to the zeolite separation membrane production process of the invention, however, seed crystals do not attach to the outside of the porous body, and therefore a reduction in the permeation flux is satisfactorily prevented when the obtained zeolite separation membrane is used for separation of a mixture.

The permeation flux ($kg/m^2h$) means the permeation of a liquid through the zeolite separation membrane per unit time. For example, when water is to be separated from a mixture of ethanol and water, the permeation flux is the permeation of water and trace ethanol through the zeolite separation membrane per unit time.

In the present invention, when a mixture of ethanol and water is to be separated, for example, the separation performance is evaluated by determining the concentration of ethanol in liquid or gas that has permeated the zeolite membrane.

Effects of the Invention

The zeolite separation membrane production process of the invention allows production of a zeolite separation membrane with adequate separation performance.

Figure 1:
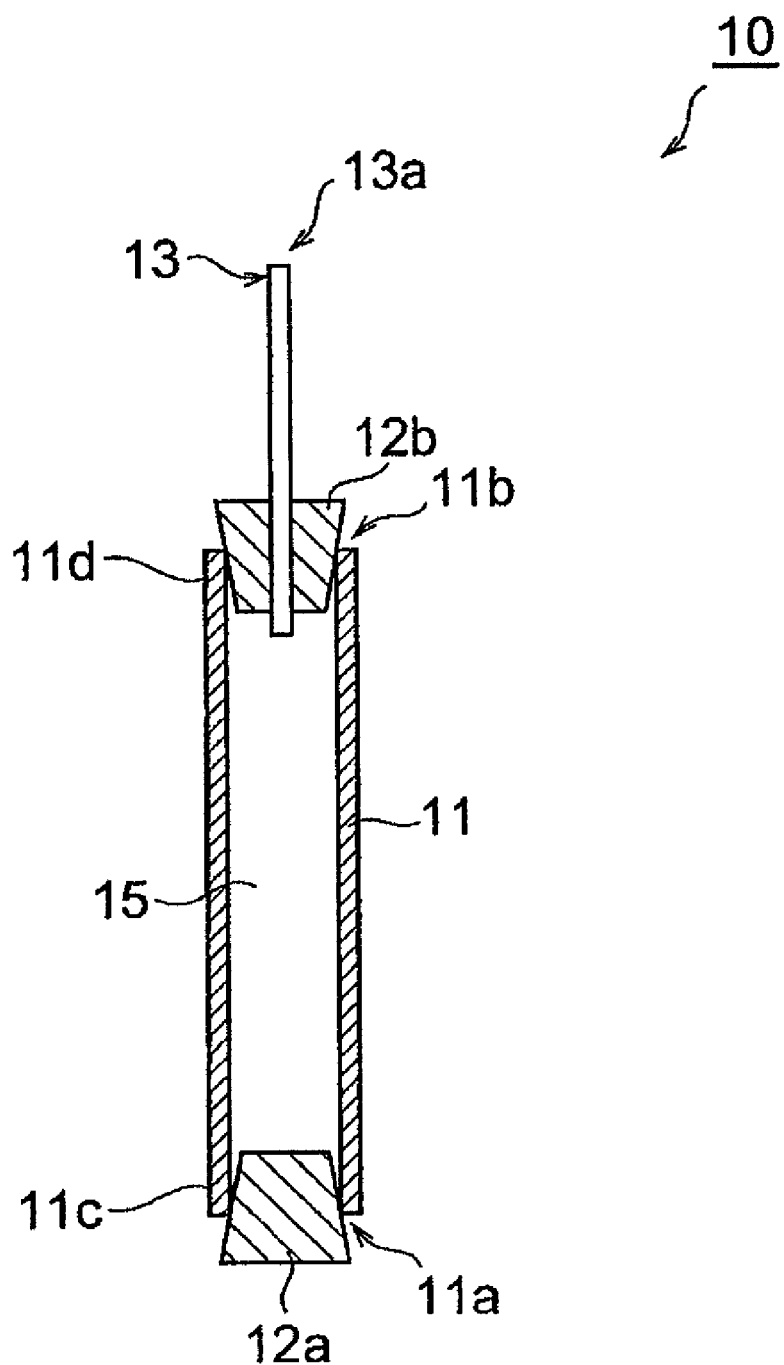
FIG. 1 is a cross-sectional view of a sealed body used in the first embodiment of the zeolite separation membrane production process of the invention.

EXPLANATION OF REFERENCE NUMERALS 10, 30, 40: Sealed body; 11: porous body; 11a, 11b, 13a: opening section; 12a, 12b, 32: sealing member; 13: open air conduit; 15: hollow section; 20: seed crystal-attaching apparatus; 21, 51: container; 22: suspension; 22a: liquid level; 23, 53: seed crystal-attached porous body; 24, 54: zeolite membrane; 25, 55: zeolite separation membrane; 50: zeolite membrane-forming apparatus; 52: reaction solution; 111: supply tank; 112: separator; 113: liquid nitrogen trap; 114: vacuum pump; 115: vacuum gauge;

116, 121: conduit; 122: stirrer; A: supply fluid; B: permeated fluid; D: lengthwise direction of a sealed body.

BEST MODES FOR CARRYING OUT THE INVENTION

Preferred embodiments of the invention will now be explained in detail, with reference to the accompanying drawings as necessary. Identical or equivalent components will be indicated by the same reference numeral in the drawings, and overlapped explanations will be omitted. Also, the dimensional proportions depicted in the drawings are not limitative.

First Embodiment

The zeolite separation membrane production process according to this embodiment comprises: a seed crystal-attaching step in which: a sealed body, which is obtained by sealing both ends of a cylindrical porous body with opening sections at both ends using sealing members, is immersed from one of the sealing member ends into a zeolite seed crystal-dispersed suspension; the suspension is allowed to permeate from the exterior of the porous body to the interior thereof; the zeolite seed crystals are thereby attached to the porous body; and a seed crystal-attached porous body is obtained; and a zeolite membrane-forming step in which: the seed crystal-attached porous body is contacted with a reaction solution containing the raw material of a zeolite membrane; the zeolite membrane is formed on the seed crystal-attached porous body; and a zeolite separation membrane is obtained.

Each step will now be described in detail.

[Seed Crystal-Attaching Step]

First, a sealed body used in a zeolite separation membrane production process according to this embodiment will be explained with reference to FIG. 1. FIG. 1 is a schematic cross-sectional view of a sealed body used in the zeolite separation membrane production process according to this embodiment. As shown in FIG. 1, the sealed body 10 has a cylindrical (tubular) porous body 11, and the porous body 11 is open at both ends 11*c* and 11*d*. That is, the porous body 11 has opening sections 11*a* and 11*b* at both ends 11*c* and 11*d*, respectively. A sealing member 12*a* is connected at one opening section 11*a*, and a sealing member 12*b* is connected at the other opening section 11*b*; and the opening sections 11*a* and 11*b* are sealed with the sealing members 12*a* and 12*b*, respectively. The sealing member 12*b* is penetrated by an open air conduit 13 that allows communication between the hollow section 15 inside the porous body 11 and the exterior thereof. The hollow section 15 of the porous body 11 is thus open to air through the open air conduit 13, whereby the hollow section 15 is constantly maintained at atmospheric pressure. The open air conduit 13 allows the entire porous body 11 to be immersed in the suspension while maintaining atmospheric pressure in the hollow section 15. The shape of the porous body 11 is not limited to a circular cylinder, and so long as it is cylindrical, it may be a polygonal cylinder.

Since the porous body 11 is porous, the pressure difference between the interior and exterior causes the fluid to permeate from the exterior of the porous body 11 toward the hollow section 15, or from the hollow section 15 of the porous body 11 toward the exterior.

The porous body 11 may be composed of, for example, a ceramic, organic polymer or metal, although there are no particular restrictions. As ceramics there may be mentioned mullite, alumina, silica, titania, zirconia and the like, as well as their sintered forms. As metals there may be mentioned stainless steel, sintered nickel, and a mixture of sintered nickel and iron. Alumina is preferably used as the porous body 11. Use of alumina as the porous body 11 can inhibit elution of the material of the porous body 11 during separation of a mixture. The porous body 11 may also be composed of sintered zeolite.

The mean pore size of the pores of the porous body 11 is preferably 0.1 μm to 20 μm, and more preferably 0.1 μm to 5 μm. This will allow a production of a zeolite separation membrane with few pinholes and high separation performance. A mean pore size of less than 0.1 μm will tend to prevent sufficient attachment of the seed crystals to the inside of the pores of the support body 11, resulting in peeling thereof, compared to a mean pore size within the range specified above. On the other hand, a mean pore size of greater than 20 μm will tend to prevent the pores from being sufficiently filled with the zeolite crystals, resulting in generation of pinholes and lowering of the separation performance of the obtained zeolite separation membrane, compared to a mean pore size within the range specified above. However, the object of the invention can still be achieved even if the mean pore size of the porous body 11 is outside of the range specified above.

The porosity of the porous body 11 is preferably 5% to 50%, and more preferably 30% to 50%. In this case, the gas permeability of the porous body 11 will be high, thus making it possible to obtain a zeolite separation membrane with a high permeation flux. If the porosity is less than 5%, the gas permeation rate will tend to be low, thus making it difficult to achieve a high permeation flux, compared to the case where the porosity is within the range specified above. On the other hand, if the porosity is greater than 50%, the mechanical strength of the porous body 11 will tend to be low compared to the case where the porosity is within the range specified above.

The shapes and materials of the sealing members 12*a* and 12*b* are not particularly restricted, so long as they allow the porous body 11 to be sealed. Elastic solids such as silicone rubber may be mentioned as candidate materials. Use of elastic solids as the sealing members 12*a* and 12*b* will allow more effective prevention of influx of the fluid from the exterior of the porous body 11 into the hollow section 15, even if the porous body 11 is immersed in the fluid while being sealed with the sealing members 12*a* and 12*b*.

The open air conduit 13 is not particularly restricted, so long as it is a conduit that allows the hollow section 15 of the porous body 11 to be open to air. The open air conduit 13 may be a glass tube, rubber tube, silicone tube, polyethylene tube, polyurethane tube or the like. The open air conduit 13 may be straight, curved or bent.

Figure 2:
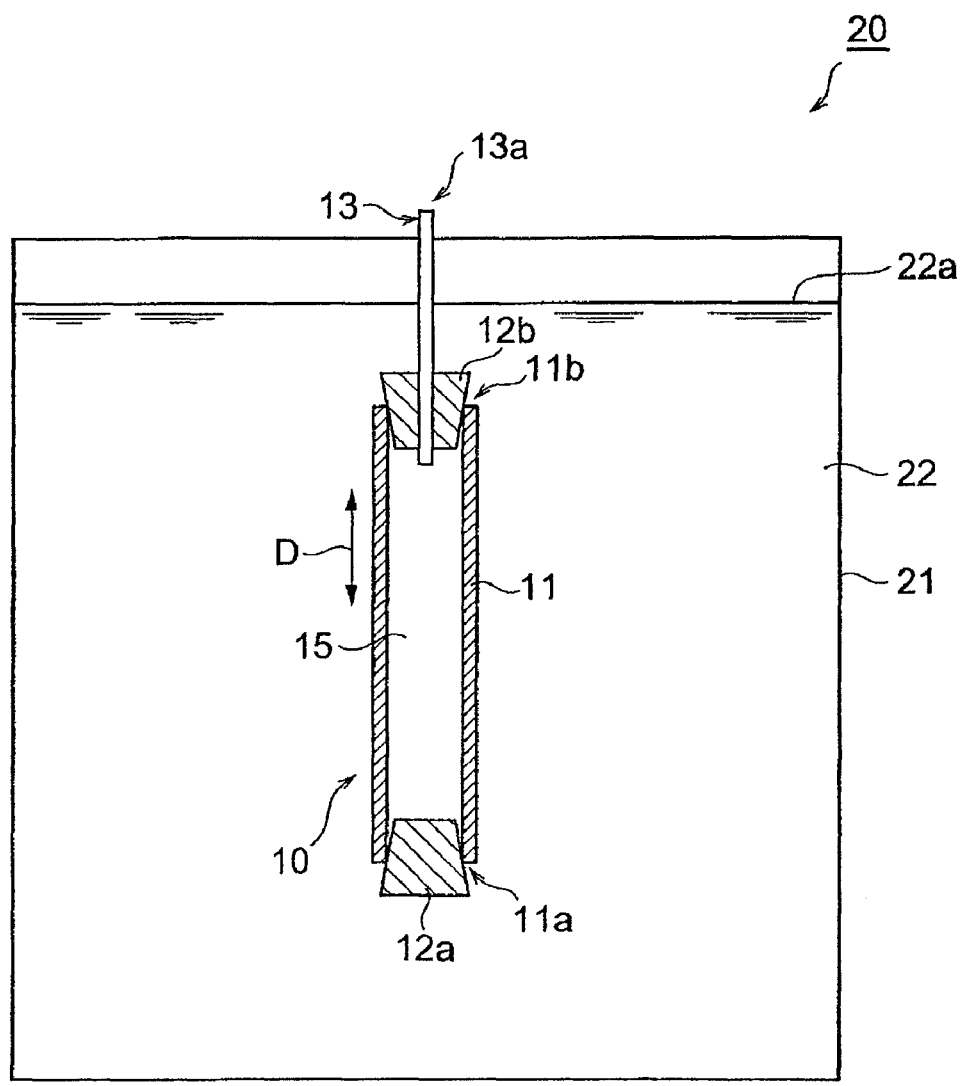
FIG. 2 is a cross-sectional view of a seed crystal-attaching apparatus for attachment of seed crystals to a porous body.

FIG. 2 is a schematic cross-sectional view of a seed crystal-attaching apparatus for attachment of seed crystals to a porous body. As shown in FIG. 2, the seed crystal-attaching apparatus 20 comprises a container 21, with a suspension 22 retained in the container 21. FIG. 2 shows a porous body 11 immersed in the suspension 22 in the container 21 of the seed crystal-attaching apparatus 20.

As shown in FIG. 2, when the sealed body 10 is immersed in the suspension 22, the sealed body 10 is immersed from the sealing member 12*a* end, i.e. the end where the open air conduit 13 is not connected. It is immersed in such a manner that the entire porous body 11 is immersed in the suspension 22, but that the tip opening section 13*a* of the open air conduit 13 is not immersed in the suspension 22.

This causes the suspension 22 to be present outside the porous body 11 while the hollow section 15 of the porous body 11 remains empty. The hollow section 15 is therefore at ordinary pressure, while the hydraulic pressure of the suspension 22 is exerted onto the outside of the porous body 11. A pressure difference is therefore created between the hollow section 15 and exterior of the porous body 11, resulting in permeation of the suspension 22 from the exterior of the porous body 11 toward the hollow section 15. The suspension 22 can therefore sufficiently penetrate into the pores of the porous body 11, thus allowing adequate introduction of seed crystals into the hollow section 15 of the porous body 11.

The sealed body 10 is preferably immersed so that its lengthwise direction D is perpendicular to the liquid level 22a of the suspension 22. This will allow the zeolite seed crystals to be attached uniformly along the circumference of the porous body 11, compared to the case where the sealed body 10 is immersed with its lengthwise direction D oblique to the liquid level 22a of the suspension 22. Also, when the sealed body 10 is removed from the suspension 22, it is preferably removed with the lengthwise direction D of the sealed body 10 perpendicular to the liquid level 22a of the suspension 22. If the sealed body 10 is removed from the suspension 22 with the lengthwise direction D of the sealed body 10 oblique or parallel to the liquid level 22a of the suspension 22, droplets of the suspension 22 may form on the underside of the porous body 11 during removal. In such cases, excessive attachment of seed crystals will occur on the sections where the droplets have formed, thus resulting in non-uniform attachment of seed crystals. A zeolite membrane formed on a porous body 11 with excessive attachment of seed crystals will also tend to have a low permeation flux and to exhibit low separation performance.

In the zeolite separation membrane production process of this embodiment, a porous body 11 having both ends 11c and 11d sealed is employed, and the sealed body 10 is immersed from the sealing member 12a end. The porous body 11 is immersed in the suspension 22 so that the suspension 22 may not enter the interior of the porous body 11. It is therefore possible to prevent attachment of seed crystals to the inside of the porous body 11. If seed crystals are present on the inside of the porous body 11, zeolite crystals will fail to adequately grow on these seed crystals during the zeolite membrane-forming step, after removing the sealing members 12a and 12b from the seed crystal-attached porous body and immersing only the seed crystal-attached porous body into the after-mentioned reaction solution. As a result, it will not be possible to obtain a dense zeolite membrane. The seed crystals attached to the inside of the porous body 11 will lower the permeation flux. According to the zeolite separation membrane production process of this embodiment, however, seed crystals do not attach to the inside of the porous body 11, and therefore a reduction in the permeation flux of the obtained zeolite separation membrane is satisfactorily prevented.

Moreover, since the hollow section 15 of the porous body 11 is open to the outside air, it is possible to consistently maintain ordinary pressure in the hollow section 15. It will therefore be possible to prevent a reduction in the pressure difference between the exterior and interior of the porous body 11, and to prevent a reduction with time in the amount of suspension permeating from the exterior of the porous body 11 to the interior thereof.

The seed crystals will differ depending on the type of zeolite in the zeolite membrane to be formed. For example, the seed crystals may consist of the same type of zeolite as the zeolite to be formed, or a type with a similar crystal structure.

The mean particle size of the seed crystals is preferably 1 nm to 1 µm, and more preferably 1 nm to 0.4 µm. Use of such microcrystals will enable a stable dispersion state to be maintained without settling of the seed crystals in the suspension 22.

The seed crystals are produced by micronization of zeolite crystals. Dispersion with a homomixer, bead mill, homogenizer or the like may be used as a method of micronization.

For production of fine zeolite powder to be used as a detergent builder, the growth time may be controlled to adjust the particle size to the order of nanometers. The seed crystals mentioned above may be zeolite fine powder produced by this technique.

The suspension 22 is obtained by suspending the seed crystals in water. The concentration of seed crystals in the suspension 22 is preferably 0.01% to 20% by weight, and more preferably 0.1% to 10% by weight. If the concentration of seed crystals is less than 0.01% by weight, seed crystals may fail to adequately attach to the porous body 11, causing defects such as pinholes to be produced in the zeolite membrane, compared to the case where the concentration is within the range specified above. On the other hand, if the concentration of seed crystals is greater than 20% by weight, peeling of the zeolite membrane and generation of defects will tend to occur, compared to the case where the concentration is within the range specified above. This is because the layer containing the seed crystals will become too thick, thus making it difficult for the seed crystals to be sufficiently crystallized within the layer except in the vicinity of its surface.

The suspension 22 containing the seed crystals may further contain an additive such as a lower alcohol or surfactant.

As described above, the seed crystals can be attached to the porous body 11 by immersion of the porous body 11 in the suspension 22. A seed crystal-attached porous body can then be obtained by removal of the sealing members 12a and 12b.

In the seed crystal-attaching step, the seed crystals are preferably dried for removal of water after attachment of the seed crystals to the porous body 11. This will help to ensure satisfactory attachment of the seed crystals to the porous body 11 in the final seed crystal-attached porous body.

[Zeolite Membrane-Forming Step]

The zeolite membrane-forming step is a step in which: the obtained seed crystal-attached porous body is contacted with a reaction solution containing the raw material of a zeolite membrane; the zeolite membrane is formed on the seed crystal-attached porous body; and a zeolite separation membrane is obtained. In the zeolite membrane-forming step, zeolite crystals are grown around the seed crystals on the seed crystal-attached porous body to form a zeolite membrane. The zeolite membrane is formed even inside the pores of the seed crystal-attached porous body. Consequently, the zeolite separation membrane production process according to this embodiment will make it possible to form a dense zeolite membrane on the porous body 11 and to produce a zeolite separation membrane with satisfactory separation performance.

Figure 3:
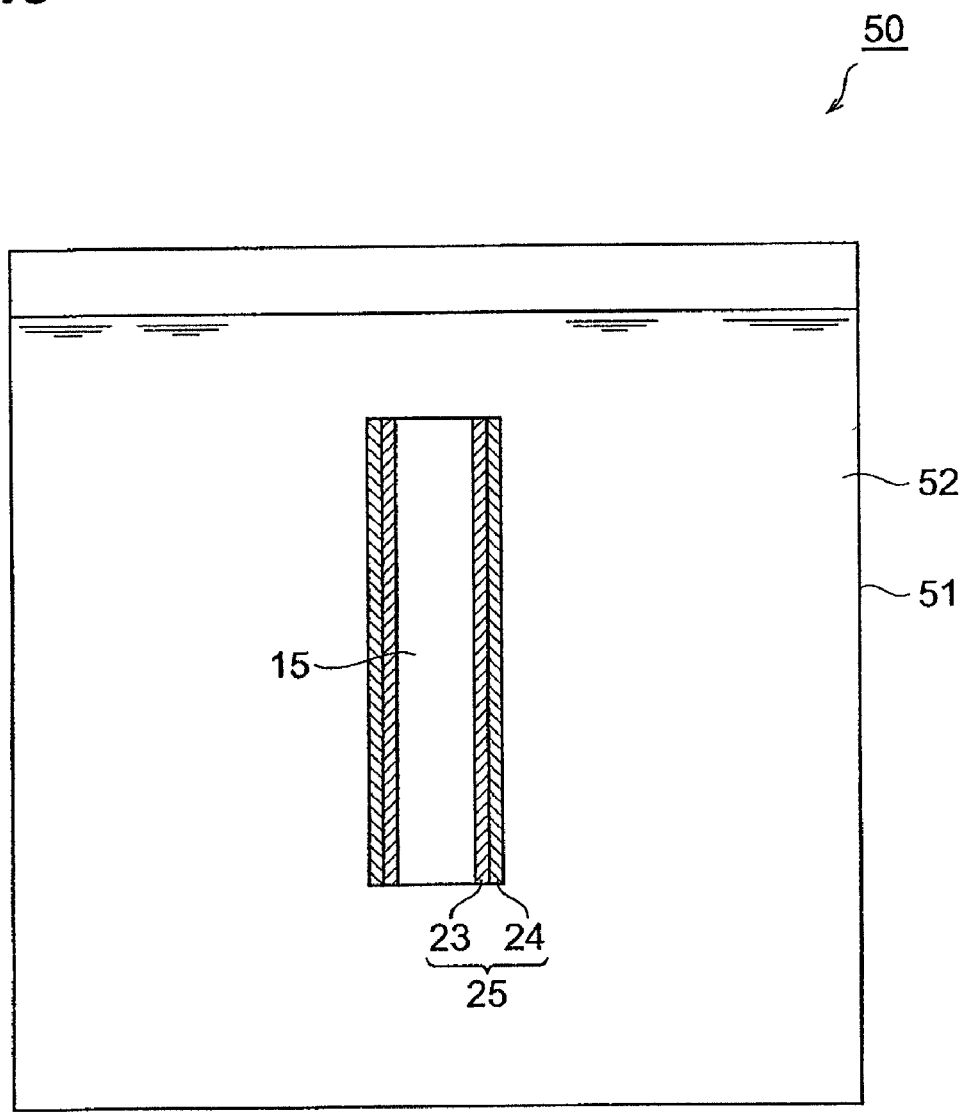
FIG. 3 is a schematic view of a zeolite membrane-forming apparatus used to form a zeolite membrane on a seed crystal-attached porous body in the second embodiment of the zeolite separation membrane production process of the invention.

FIG. 3 is a schematic cross-sectional view showing an example of a zeolite membrane-forming apparatus used to obtain a zeolite separation membrane by formation of a zeolite membrane on a seed crystal-attached porous body in a reaction solution. As shown in FIG. 3, the zeolite membrane-forming apparatus 50 comprises a container 51, with a reaction solution 52 retained in the container 51. The seed crystal-attached porous body 23 is immersed in the reaction solution 52. The reaction solution 52 is present inside as well as outside the seed crystal-attached porous body 23. Zeolite crystals are grown around the seed crystals on the seed crystal-attached porous body 23 to form a zeolite membrane 24. A zeolite separation membrane 25 is thus obtained. Since the seed crystals are attached to the outside of the porous body 11 in the seed crystal-attached porous body 23, the zeolite membrane 24 is formed on the outside of the seed crystal-attached porous body 23.

Formation of the zeolite membrane 24 can be accomplished by hydrothermal synthesis, dry gel conversion or the like. Hydrothermal synthesis is preferred for formation of the zeolite membrane 24. The method for contacting the seed crystal-attached porous body 23 with the reaction solution 52 is not particularly restricted, and there may be mentioned impregnation, dip coating, spray coating, application, filtration and the like.

Formation of the zeolite membrane 24 by hydrothermal synthesis will now be explained in detail.

In this case, the raw material of the zeolite membrane may be added to water and stirred to prepare a reaction solution 52 for use in the zeolite-forming reaction; and the seed crystal-attached porous body 23 may be immersed in the reaction solution 52 to form the zeolite membrane 24 on the seed crystal-attached porous body 23.

The raw material of the zeolite membrane is alumina source and silica source, and may, if necessary, comprise alkali metal source and/or alkaline earth metal source. As alumina sources there may be mentioned aluminum salts such as aluminum hydroxide, sodium aluminate, aluminum sulfate, aluminum nitrate and aluminum chloride, as well as alumina powder, colloidal alumina and the like. As silica sources there may be mentioned alkali metal silicates such as sodium silicate, water glass and potassium silicate, as well as silica powder, silicic acid, colloidal silica, acid clay, kaolin, silicon alkoxides (such as aluminum isopropoxide) and the like. As alkali metal sources and alkaline earth metal sources there may be mentioned sodium chloride, potassium chloride, calcium chloride, magnesium chloride and the like. An alkali metal silicate may be used as both a silica source and an alkali metal source.

The molar ratio of silica source and alumina source in the reaction solution 52 (calculated as $SiO_2/Al_2O_3$) may be appropriately set depending on the type of zeolite in the desired zeolite membrane 24.

There are no particular restrictions on the concentration of silica source and alumina source. In the zeolite membrane-forming step, the concentration of silica source or alumina source may be increased to form a gel-like reaction solution for contact with the seed crystal-attached porous body 23, or the concentration of silica source or alumina source may be lowered to form a low-viscosity reaction solution for contact with (impregnation into) the seed crystal-attached porous body.

The reaction solution 52 may further contain an additive such as a crystallization promoter. As crystallization promoters there may be mentioned tetrapropylammonium salts, tetrabutylammonium salts and the like.

The zeolite separation membrane production process according to the invention can yield zeolite membranes 24 with a variety of compositions and structures, including types MFI, X, Y, A and T.

After forming the zeolite membrane 24 on the seed crystal-attached porous body 23 by contacting the seed crystal-attached porous body 23 with the reaction solution 52, the formed zeolite membrane 24 is preferably cleaned. Matter attached to the zeolite membrane 24, such as unreacted substances, zeolite particles and amorphous components, can be removed by cleaning.

The zeolite membrane 24 is easily dried immediately after formation thereof, because it is at high temperature. When the zeolite membrane 24 is separated from the reaction solution 52, the moisture on the surface of the zeolite membrane 24 evaporates, and the surface is dried. Drying of the surface of the zeolite membrane 24 will harden attached matter on the surface of the zeolite membrane 24, and tend to hamper removal of the attached matter during the cleaning step.

Cleaning of the zeolite membrane 24 is therefore preferably performed immediately after the zeolite membrane 24 has been formed. Cleaning is preferably performed immediately after formation of the zeolite membrane 24, in order to clean the zeolite membrane 24 before it dries, and the cleaning time is preferably no longer than 30 minutes.

The cleaning water used for the cleaning is not particularly restricted, but purified water is preferred. If water other than purified water, such as tap water containing alkali ions, is used as the cleaning water, the alkali ions in the tap water may attach to the zeolite membrane 24 unlike the case where purified water is used. Moreover, for example, an alkali metal or alkaline earth metal in the zeolite membrane 24 may become replaced by calcium in the tap water, potentially resulting in change in the properties of the zeolite membrane 24 due to change in the properties of the zeolite crystals.

The method for cleaning the zeolite membrane 24 is not particularly restricted. As cleaning methods for the zeolite membrane 24, there may be mentioned manual cleaning, spray cleaning, brush cleaning and ultrasonic cleaning.

As described above, attached matter on the surface of the zeolite membrane 24 can be removed by cleaning of the zeolite membrane 24.

A zeolite separation membrane 25 is thus obtained.

Second Embodiment

A second embodiment of the zeolite separation membrane production process of the invention will now be explained with reference to FIG. 4. Components identical or equivalent to those of the first embodiment will be indicated by the same reference numeral, and overlapped explanations will be omitted.

Figure 4:
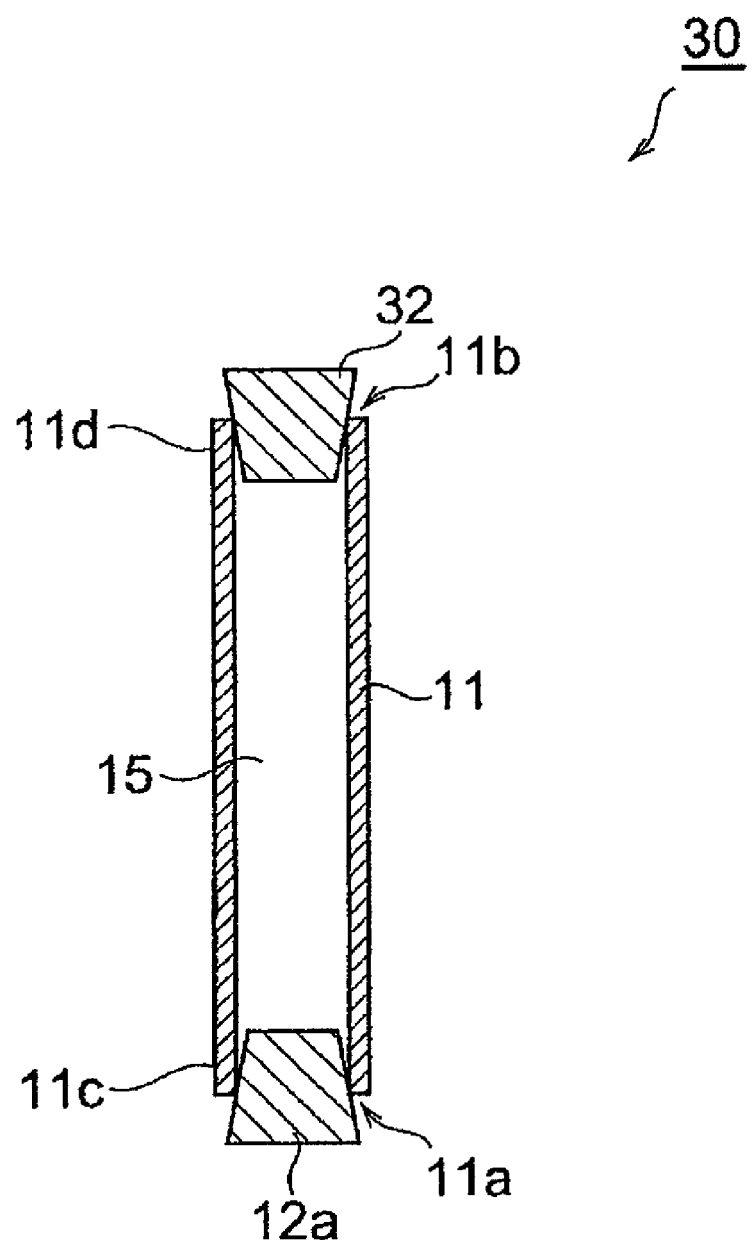
FIG. 4 is a cross-sectional view of a sealed body used in the second embodiment of the zeolite separation membrane production process of the invention.

FIG. 4 is a schematic cross-sectional view of a sealed body used in the second embodiment of the zeolite separation membrane production process of the invention. As shown in FIG. 4, this embodiment differs from the first embodiment in that in the seed crystal-attaching step, the sealed body 30 is provided with a sealing member 32 instead of the sealing member 12b, and the hollow section 15 of the porous body 11 is not open to air.

The sealed body 30 will now be explained in more detail using FIG. 4.

As shown in FIG. 4, the sealed body 30 comprises a porous body 11, and opening sections 11a and 11b at both ends 11c and 11d of the porous body 11. The sealing member 12a is fitted in one opening section 11a, and the sealing member 32 is fitted in the other opening section 11b. In other words, the porous body 11 is completely sealed by the sealing members 12a and 32, so that the hollow section 15 is not open to air. The sealing member 32 used may be one with the same shape and material as the sealing members 12a and 12b.

When the sealed body 30 is contacted with the same suspension as that used in the first embodiment, the sealed body 30 may be immersed from either of the sealing member 12a and 32 ends. By utilizing the pressure difference between the interior and exterior of the porous body 11, it is possible to adequately introduce seed crystals into the pores of the porous body 11 to form a dense zeolite membrane. A zeolite separation membrane with satisfactory separation performance can therefore be obtained.

Third Embodiment

A third embodiment of the zeolite separation membrane production process of the invention will now be explained.

Components identical or equivalent to those of the first and second embodiments will be indicated by the same reference numeral, and overlapped explanations will be omitted.

Figure 5:
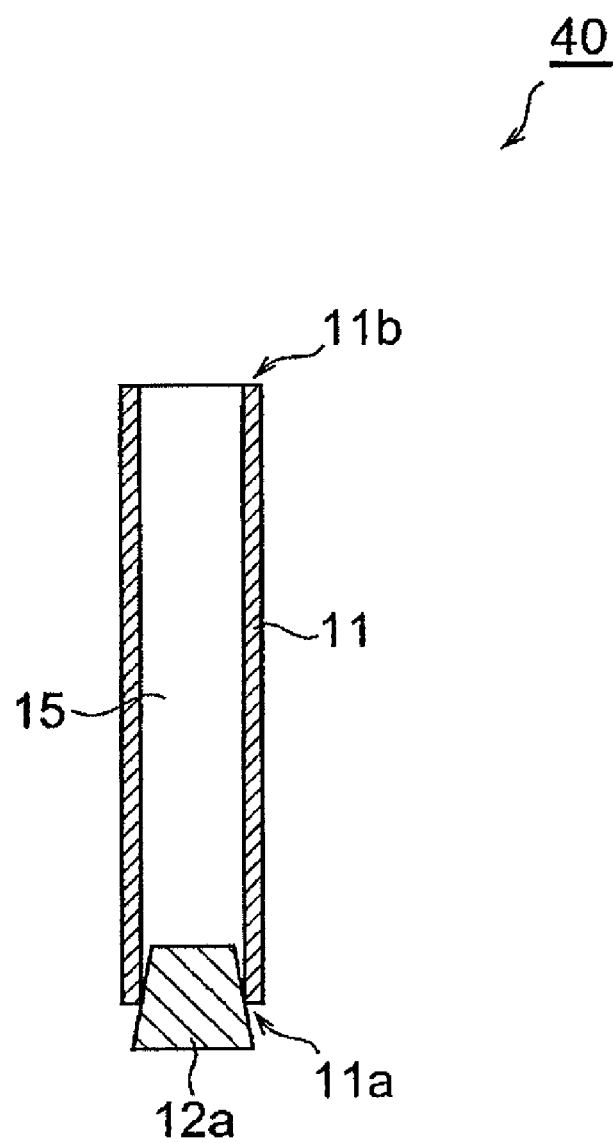
FIG. 5 is a cross-sectional view of a sealed body used in the third embodiment of the zeolite separation membrane production process of the invention.

FIG. 5 is a schematic cross-sectional view of a sealed body used in the third embodiment of the zeolite separation membrane production process of the invention. As shown in FIG. 5, this embodiment differs from the first embodiment in that the sealed body 40 is not provided with the sealing member 12b.

When the sealed body 40 is immersed in a suspension containing zeolite seed crystals, the sealed body 40 is immersed from the sealing member 12a end. The immersion is performed in such a manner that the suspension does not enter the hollow section 15 inside the sealed body 40. Specifically, a portion of the porous body 11 is not submerged in the suspension. This will create a pressure difference between the interior and exterior of the porous body 11, thus allowing adequate introduction of seed crystals into the porous body 11.

Consequently, the zeolite separation membrane production process according to this embodiment will make it possible to form a dense zeolite membrane on the porous body 11 and to produce a zeolite separation membrane with satisfactory separation performance.

Fourth Embodiment

A fourth embodiment of the zeolite separation membrane production process of the invention will now be explained. Components identical or equivalent to those of the first to third embodiments will be indicated by the same reference numeral, and overlapped explanations will be omitted.

Figure 6:
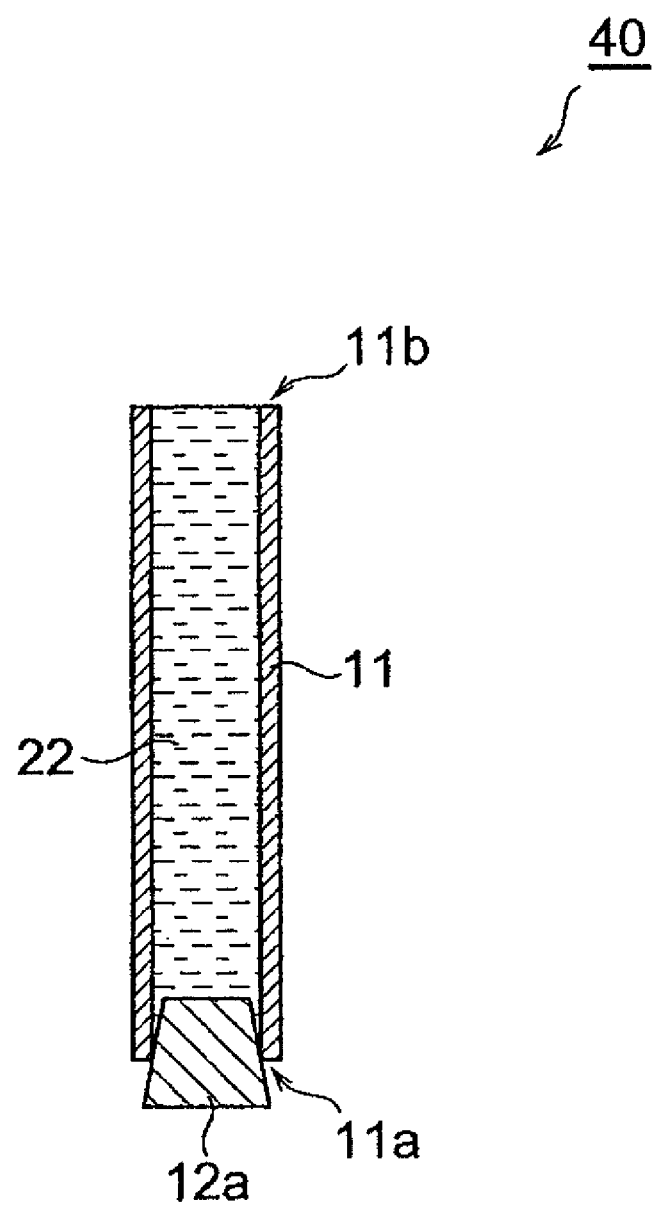
FIG. 6 is a cross-sectional view of a sealed body according to the fourth embodiment, the sealed body retaining a suspension containing zeolite seed crystals.

This embodiment differs from the third embodiment in that in the seed crystal-attaching step, instead of immersing the sealed body 40 in the suspension, the suspension 22 is introduced from the opening section 11b of the sealed body 40, as shown in FIG. 6, creating a high pressure inside the porous body 11 and a low pressure outside.

This creates a pressure difference between the interior and exterior of the porous body 11, and the suspension 22 is thereby allowed to permeate from the interior of the porous body 11 to the exterior thereof, resulting in attachment of the zeolite seed crystals to the porous body 11. A seed crystal-attached porous body is thus obtained. The suspension 22 can sufficiently penetrate into the pores of the porous body 11, thus allowing adequate introduction of seed crystals into the porous body 11.

Figure 7:
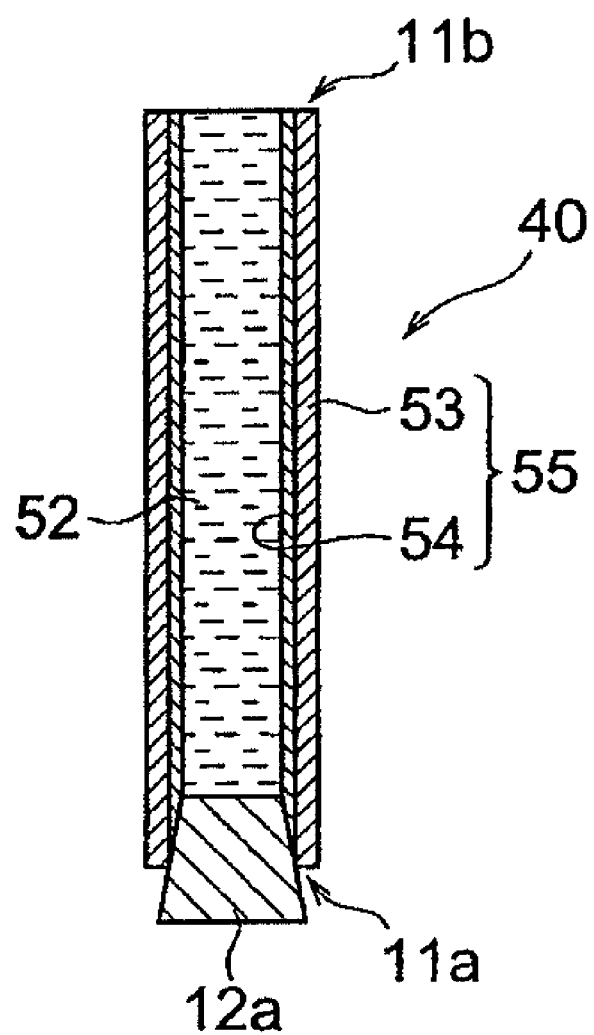
FIG. 7 is a cross-sectional view of a zeolite separation membrane according to the fourth embodiment, the zeolite separation membrane retaining a reaction solution containing zeolite raw material.

As shown in FIG. 7, this embodiment also differs from the third embodiment in that in the zeolite membrane-forming step, the reaction solution 52 containing the raw material of a zeolite membrane is introduced inside the seed crystal-attached porous body 53 to form the zeolite membrane 54 on the seed crystal-attached porous body 53.

As a result, zeolite crystals grow around the seed crystals to form the zeolite membrane 54. The zeolite membrane 54 is formed even inside the pores of the seed crystal-attached porous body 53. Consequently, the zeolite separation membrane production process according to this embodiment will make it possible to form a dense zeolite membrane 54 inside the porous body 11 and to produce a zeolite separation membrane 55 with satisfactory separation performance. In the zeolite separation membrane production process of this embodiment, since the suspension is not present outside of the porous body 11, attachment of seed crystals to the outside of the porous body 11 can be prevented. If seed crystals have attached to the outside of the porous body 11, zeolite crystals will fail to grow sufficiently on these seed crystals during the zeolite membrane-forming step, making it impossible to obtain a dense zeolite membrane. Moreover, these seed crystals will not only fail to enhance the separation performance, but also lower the permeation flux. According to the zeolite separation membrane production process of this embodiment, however, seed crystals do not attach to the outside of the porous body 11, and therefore a reduction in the permeation flux can be satisfactorily prevented when the obtained zeolite separation membrane 55 is used for separation of a mixture.

In this embodiment, the reaction solution 52 is removed from the hollow section 15 of the sealed body 40 after the zeolite membrane 54 has been formed on the seed crystal-attached porous body 53. The zeolite membrane 54 is preferably cleaned thereafter in the same manner as in the first embodiment.

Although preferred embodiments of the invention have been described above, the invention is not limited thereto.

For example, in the first to fourth embodiments, the sealing member 12a, 12b or 32 is removed from the end of the porous body 11, and the zeolite membrane-forming step is then performed using the obtained porous body as the seed crystal-attached porous body. However, alternatively, the sealing member 12a, 12b or 32 may be left at the end of the porous body 11, and the zeolite membrane may be formed using the porous body as the seed crystal-attached porous body. In this case, the sealing member 12a, 12b or 32 is removed after forming the zeolite membrane. This modification has the advantage of facilitating production of a zeolite separation membrane.

Also, in the zeolite separation membrane production process according to the first to fourth embodiments, the zeolite membrane is preferably cooled in the zeolite membrane-forming step. Cooling of the zeolite membrane will slow drying of the zeolite membrane, and help prevent hardening of attached matter. Therefore, cleaning of the zeolite membrane after or during cooling will facilitate removal of attached matter on the zeolite membrane, thus yielding a uniform zeolite separation membrane with satisfactory permeation flux and separation performance.

When cooling and cleaning of the zeolite membrane are performed simultaneously, the zeolite membrane may be cleaned while cooling it with the cleaning water, after the cleaning water is brought to low temperature (for example, 11° C. to 40° C.). This can reduce the number of steps involved, thus shortening the operation time. When cooling is performed after separation of the zeolite membrane and reaction solution, and before cleaning, the reaction solution may, for example, be extracted from the container, where the reaction solution has been retained, and where the zeolite membrane has been immersed in the reaction solution. In this case, purified water for cooling is then introduced into the container. This can dilute residual reaction solution on the zeolite membrane, thus reducing the proportion of reaction solution contaminating the cleaning water during cleaning.

The cooling method is not particularly restricted, and as examples there may be mentioned: a method wherein the zeolite membrane is immersed in water; a method wherein the zeolite membrane is sprayed with water; and the like.

The zeolite membrane is preferably immersed in water after cleaning. Immersion will not only remove extraneous matter that attach to the zeolite membrane surface during cleaning, but also remove attached matter within the zeolite membrane. In other words, if the zeolite membrane is immersed in water after cleaning, the water will sufficiently penetrate into the zeolite membrane. Then, impurities (such as sodium) which are derived from the raw material of the zeolite membrane and which have been attached within the zeolite membrane will be eluted into the penetrating water, and satisfactorily removed from the zeolite membrane.

EXAMPLES

The present invention will now be explained in greater detail based on examples and comparative examples, with the understanding that the invention is not limited to the examples described below.

[Preparation of Suspension]

Type A zeolite fine particles (seed crystals, particle size: 100 nm) were placed in water and stirred to yield a suspension with a concentration of 0.5% by weight.

[Preparation of Reaction Solution]

1 part by mole of alumina ($Al_2O_3$), 2 parts by mole of silicon dioxide ($SiO_2$) and 2 parts by mole of sodium oxide ($Na_2O$) were added to 150 parts by mole of water to yield a reaction solution.

Example 1

The sealed body 10 shown in FIG. 1 was used for this example. Specifically, a tubular porous body 11 made of α-alumina and having opening sections 11a and 11b at both ends was prepared. The porous body 11 had a mean pore size of 0.6 μm, an outer diameter of 12 mm, an inner diameter of 9 mm and a length of 10 cm. A sealing member 12a was tightly fitted in one opening section 11a of the porous body 11, and a sealing member 12b penetrated by an open air conduit 13 was tightly fitted in the other opening section 11b.

The sealed body 10 was immersed in the aforementioned suspension from the sealing member 12a end. The entire porous body 11 was immersed in the suspension, and the tip of the open air conduit 13 was not immersed in the suspension. The sealed body 10 was immersed in the suspension for 3 minutes. The sealed body 10 was then drawn out at a rate of about 0.2 cm/s. The porous body 11 obtained by removing the sealing members 12a and 12b from the sealed body 10 was dried for 2 hours in a thermostatic bath at 25° C., and then dried for 16 hours in a thermostatic bath at 70° C. to produce a seed crystal-attached porous body.

The seed crystal-attached porous body was immersed in the aforementioned reaction solution and held at 80° C. for 3 hours to form a zeolite membrane on the surface of the seed crystal-attached porous body.

The obtained zeolite membrane was then cleaned with a brush.

Further, it was immersed for 16 hours in warm water at 40° C. A zeolite separation membrane was thus obtained.

Example 2

A zeolite separation membrane was obtained in the same manner as in Example 1, except that instead of the sealing member 12a, a sealing member 32 as shown in FIG. 3 was fitted in the opening section 11b of the sealed body 10.

Comparative Example 1

A zeolite separation membrane was obtained in the same manner as in Example 1, except that the porous body used in the seed crystal-attaching step lacked the sealing members 12a and 12b.

(Evaluation Method)

[Separation Performance and Permeation Flux]

Figure 8:
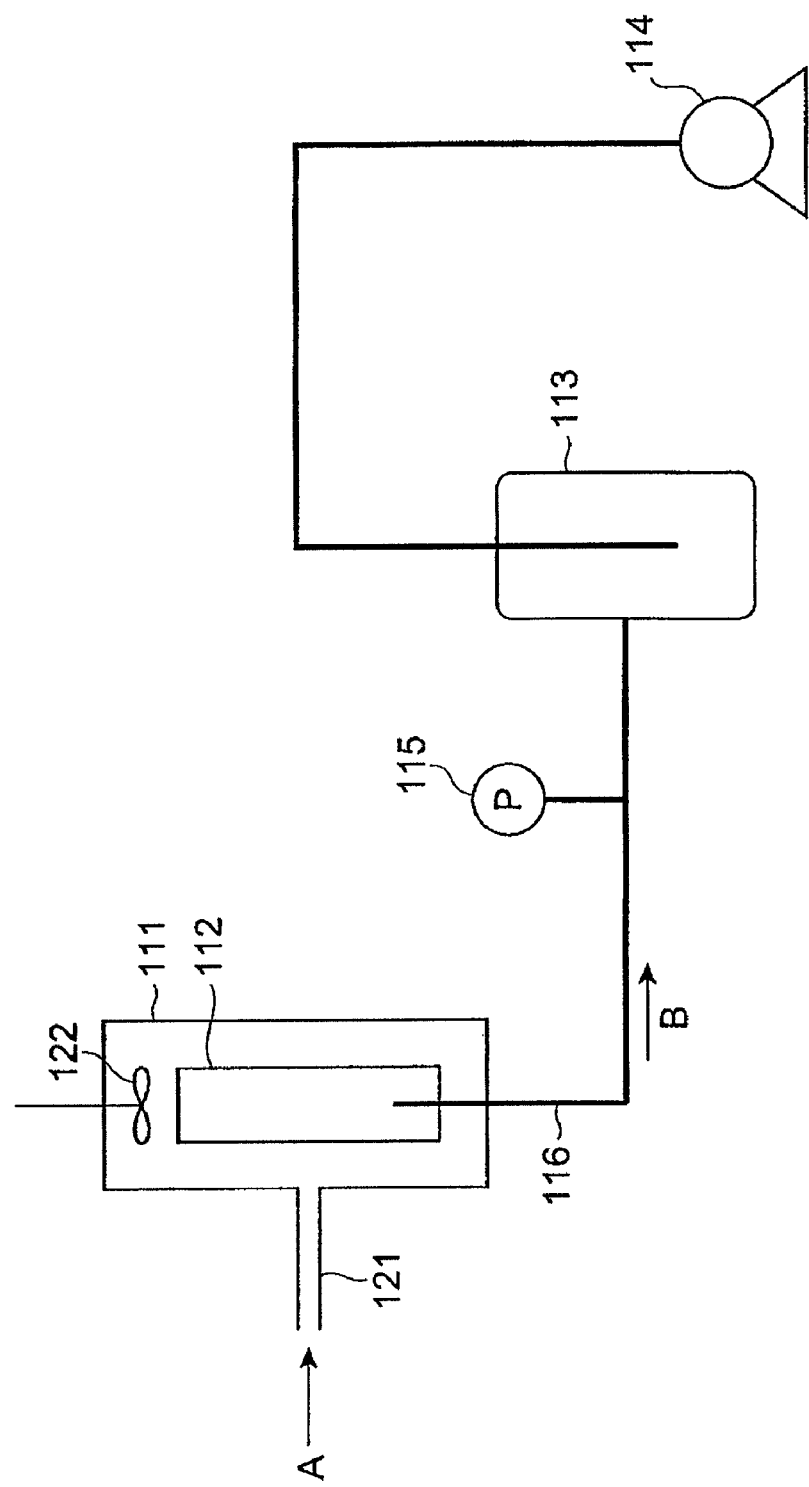
FIG. 8 is a schematic diagram of the pervaporation (PV) test apparatus used in Examples 1 and 2 and Comparative Example 1.

In order to evaluate the separation performance of the zeolite separation membranes obtained in Examples 1 and 2 and Comparative Example 1, a pervaporation (PV) test apparatus as shown in FIG. 8 was assembled. The PV test apparatus will now be described. The PV test apparatus comprises a supply tank 111 to which a supply fluid A is supplied. A conduit 121 for supply of the supply fluid A to the supply tank 111 is connected to the supply tank 111, and the supply tank 111 comprises therein a separator 112 and a stirrer 122 for stirring of the supply fluid A. The zeolite separation membrane of Example 1 or 2 or Comparative Example 1 was used as the separator 112. A conduit 116 is also connected at the open end of the separator 112, and a vacuum pump 114 is connected to the other end of the conduit 116 via a liquid nitrogen trap 113. A vacuum gauge 115 is also installed along the conduit 116.

The supply fluid A (ethanol/water ratio by weight=90/10) at 75° C. was supplied to the supply tank 111 of the PV test apparatus through the conduit 121 for 20 minutes, and the hollow section of the separator 112 was evacuated with the vacuum pump 114 (degree of vacuum by vacuum gauge 115: 10 to 1000 Pa). Fluid B which passed through the separator 112 was collected in the liquid nitrogen trap 113. The compositions of the supply fluid A and permeated fluid B were measured using a gas chromatograph (trade name: GC-14B, product of Shimadzu Corporation), and the ethanol concentration of the permeated fluid (water) was determined. The weight of the collected fluid was also measured, and the permeation flux Q was determined based on the weight, membrane area and collection time. The results are shown in Table 1.

TABLE 1

| | Permeation flux ($kg/m^2 h$) | Ethanol concentration (wt %) |
|---|---|---|
| Example 1 | 6 | 0.014 |
| Example 2 | 6 | 0.038 |
| Comparative Example 1 | 5 | 0.054 |

The results of Examples 1 and 2 and Comparative Example 1 demonstrated that the production processes of Examples 1 and 2 make it possible to adequately reduce the ethanol concentration compared to the production process of Comparative Example 1. It was thus confirmed that the zeolite separation membrane production process of the invention makes it possible to produce a zeolite separation membrane with satisfactory separation performance. Also, since the permeation flux was higher in Examples 1 and 2 than in Comparative Example 1, it was demonstrated that the zeolite separation membrane production process of the invention makes it possible to achieve sufficiently high permeation flux.

The invention claimed is:

1. A process for production of a zeolite separation membrane, comprising:
    a seed crystal-attaching step in which: a tubular porous body, wherein one end is sealed with a sealing member and the other end is open, is immersed from the sealing member end into a suspension containing zeolite seed crystals while keeping the interior of the tubular porous body open to air; the suspension is allowed to permeate from the exterior of the tubular porous body to the interior thereof by hydraulic pressure of the suspension; the zeolite seed crystals are thereby attached to the exterior of the tubular orous body; and a seed crystal-attached porous body is obtained; and
    a zeolite membrane-forming step in which: a zeolite membrane is formed on the exterior of the tubular porous body by contacting the exterior of the seed crystal-attached tubular porous body with a reaction solution containing the raw material of the zeolite membrane; and a zeolite separation membrane is obtained.

2. The process for production of a zeolite separation membrane according to claim 1, wherein:
the sealing member is provided in a detachable manner on the porous body; and
between the seed crystal-attaching step and the zeolite membrane-forming step, or after the zeolite membrane-forming step, the sealing member is detached from the porous body.

3. The process for production of a zeolite separation membrane according to claim 1, wherein:
the open end of the tubular porous body does not have a sealing member, or the open end has a sealing member with an open air means.

4. The process for production of a zeolite separation membrane according to claim 1, wherein:
the mean pore size of the pores of the tubular porous body is 0.1 µm to 20 µm and the porosity of the porous body is 5% to 50%.

* * * * *